United States Patent [19]
Lee

[11] 3,989,020
[45] Nov. 2, 1976

[54] MIXTURE-DRAWING INTERNAL COMBUSTION ENGINE

[75] Inventor: Wenpo Lee, Wolfsburg, Germany

[73] Assignee: Volkswagenwerk Aktiengesellschaft, Germany

[22] Filed: Apr. 28, 1975

[21] Appl. No.: 572,330

[30] Foreign Application Priority Data
May 7, 1974  Germany............................ 2421913

[52] U.S. Cl. .................... 123/122 H; 123/122 AB
[51] Int. Cl.² ......................................... F02M 31/00
[58] Field of Search... 123/122 AC, 122 H, 122 AB, 123/122 A, 122 AA, 179 H, 122 R, 142.5, 133; 261/DIG. 55, DIG. 21, 144, 145

[56] References Cited
UNITED STATES PATENTS

| 1,232,041 | 7/1917 | Johnson | 123/122 H |
| 1,318,068 | 10/1919 | Giesler | 123/122 H |
| 3,795,234 | 3/1974 | Stolz | 123/179 H |
| 3,814,071 | 6/1974 | Buchwald | 123/122 AB |
| 3,832,984 | 9/1974 | Taguchi | 123/122 AC |
| 3,850,153 | 11/1974 | Sigwald | 123/122 AB |

*Primary Examiner*—Ronald H. Lazarus
*Attorney, Agent, or Firm*—Brumbaugh, Graves, Donohue & Raymond

[57] ABSTRACT

A mixture-drawing internal combustion engine comprises a cooling water circulation system, an intake conduit and an automatically controlled heating device in heat exchange contact with the intake conduit. The heating device receives cooling water from the cooling water circulation system and exhaust gases from the internal combustion engine. A shutoff device controls the flow of the cooling water through the heating device. The shutoff device remains closed until a predetermined cooling water temperature is reached. When the predetermined cooling water temperature is reached, the shutoff device opens increasingly as the temperature of the cooling water rises.

4 Claims, 1 Drawing Figure

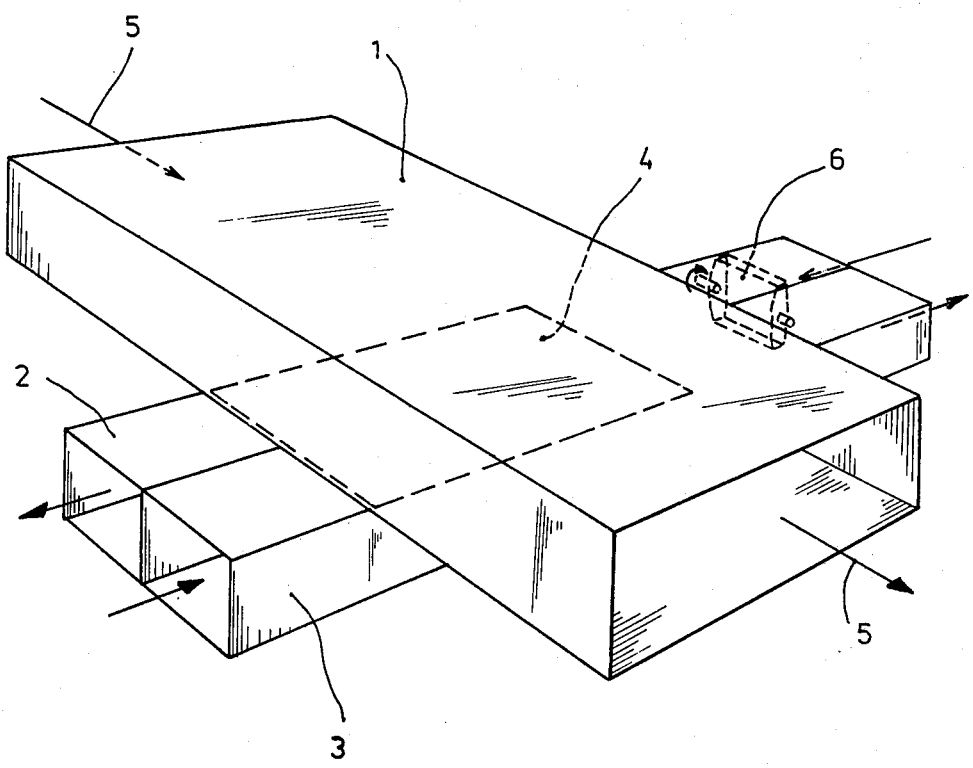

MIXTURE-DRAWING INTERNAL COMBUSTION ENGINE

BACKGROUND OF THE INVENTION

The present invention relates essentially to a mixture-drawing internal combustion engine having an automatically controlled heating device arranged in heat exchange contact with an intake conduit for a fuel-air mixture. The heating device receives both cooling water diverted from a cooling water circulation system of the internal combustion engine and exhaust gases emitted from the internal combustion engine.

An internal combustion engine described in German Pat. No. 861,176 comprises a combined cooling water and exhaust gas heating system for an intake conduit of the internal combustion engine. In that heating system, automatic control is achieved by a deflection valve installed in a heating pipe carrying the exhaust gases, the deflection valve being actuated by a bimetallic spring. During idling of the internal combustion engine and at low speeds, the deflection valve directs the exhaust gases to a heating zone of the intake conduit; while at higher engine speeds, the exhaust gases are diverted directly into the exhaust system circumventing the heating zone of the intake conduit.

During the operation of heating systems of that type, it has been found that locating the deflection valve and its actuating mechanism within the heating pipe carrying the exhaust gases provides imperfect control of the heating device. More particularly, after some period of operation, the dirt and soot accompanying the exhaust gases are deposited on guides of the deflection valve, thereby disadvantageously hindering the proper operation thereof. Furthermore, the high temperature of the exhaust gases tends to cause operating difficulties which may result in the failure of the heating device.

SUMMARY OF THE INVENTION

It is an object of the present invention to provide an internal combustion engine, of the mixture-drawing type, which avoids the disadvantages and difficulties of the prior art engines noted above.

This object, as well as other objects which become apparent in the discussion that follows, are achieved, according to the present invention, by an effective and flawless heating device which heats a fuel-air mixture flowing through an intake conduit, as soon as possible after the starting of the internal combustion engine, to an optimum temperature for ensuring satisfactory vaporization of the fuel contained in the fuel-air mixture, thereby forming a favorable fuel-air mixture. On the other hand, the transfer of heat to the fuel-air mixture should not be too great when the internal combustion engine is operating at higher power outputs causing the temperature of the exhaust gases to be very high, otherwise the performance of the internal combustion engine diminishes due to the reduction in the delivery rate of the fuel-air mixture.

In order to regulate the heating of the fuel-air mixture, the present invention provides a shutoff device for controlling the flow rate of the cooling water passing through the heating device. The shutoff device is designed to remain closed until the cooling water reaches a predetermined temperature. After the cooling water reaches the predetermined temperature, the shutoff device opens increasingly as the temperature of the cooling water rises. Since the shutoff device, preferably designed as a thermostat, is located in the cooling water pipe, rather than in the heating pipe carrying the exhaust gases, it is possible to regulate the heating device simply and effectively without the danger of mechanical malfunction or failure. If the shutoff device is closed during the cold-starting phase of the internal combustion engine and the relatively cold water in the heating device is motionless, the comparatively hot stream of exhaust gases flowing through the heating device rapidly raises the temperature of the fuel-air mixture, thereby ensuring the formation of a favorable fuel-air mixture as soon as possible after the starting of the internal combustion engine. When the temperature of the cooling water exceeds a predetermined temperature, the shutoff device opens to connect the cooling water in the heating device with the cooling water system of the internal combustion engine. The circulating cooling water permits the temperature of the heating device to maintain a substantially constant temperature at a heating zone of the intake conduit, even though the temperature of the exhaust gases is increasing as the power output of the internal combustion engine increases. By constantly maintaining the temperature of the heating device at an optimum value, the efficiency of the internal combustion engine is maximized.

In accordance with a preferred embodiment of the present invention, the pipes carrying the cooling water and exhaust gases are arranged in mutual heat exchange contact with each other and with the bottom of the intake conduit, through which flows the fuel-air mixture. Locating the pipes carrying the cooling water and exhaust gases adjacent the bottom of the intake conduit is especially advantageous because the liquid fuel contained in the fuel-air mixture is usually precipitated on the bottom of the intake pipe, from where it flows in the form of droplets to the cylinders of the internal combustion engine. Another aspect of the invention provides for an arrangement in which the pipes carrying the cooling water and exhaust gases are positioned adjacent to each other, with the cooling water and the exhaust gases flowing in opposite directions. This countercurrent flow ensures favorable heat exchange between the exhaust gases and the cooling water.

BRIEF DESCRIPTION OF THE DRAWING

For a further understanding of the present invention, reference may be had to the accompanying drawing, in which the single FIGURE is a partial diagrammatical illustration of a portion of a flat-tube intake conduit with cooling water and exhaust gas pipes extending across the bottom thereof.

DESCRIPTION OF THE PREFERRED EMBODIMENT

Referring to the drawing, a fuel-air mixture flows through an intake conduit 1 of an internal combustion engine (not shown) in the direction of arrows 5. A cooling water pipe 2 and an exhaust gas pipe 3 extend across the bottom surface of the intake conduit 1 in heat exchange contact therewith and with one another. The cooling water pipe 2 is adapted to receive cooling water diverted from a cooling system of the internal combustion engine; while the exhaust gas pipe 3 is adapted to receive exhaust gases emitted from the internal combustion engine. A shutoff device 6, e.g., a thermostat, is positioned in the cooling water pipe 2 for blocking the flow of cooling water at cooling water temperatures below a predetermined value and for permitting the flow of cooling water at cooling water temperatures above the predetermined value. The portion of the intake conduit 1 in direct heat exchange contact with the cooling water pipe 2 and the exhaust gas pipe 3 defines an approximately rectangular heating zone 4 on the bottom of the intake pipe 1 which is maintained at a substantially constant temperature.

During the cold-starting phase of the internal combustion engine, the cooling water is initially cold, and the shutoff device 6 consequently blocks the passage of the cooling water through the cooling water pipe 2. During the warming-up phase of the internal combustion engine, the exhaust gases flowing through the exhaust gas pipe 3 are already comparatively hot. Due to the constant flow of the hot exhaust gases through the exhaust gas pipe 3, the heating zone 4 is heated rapidly, especially since the rate of heat transfer from the circulating exhaust gases to the stationary cooling water is relatively small. Thus, the fuel-air mixture is effectively heated, as soon as possible after the cold-starting of the internal combustion engine, resulting in the formation of a favorable fuel-air mixture. The provision of a favorable fuel-air mixture improves the combustion process in the cylinders, as well as the general operating behavior of the engine. Another advantageous effect of heating the fuel-air mixture is the reduction of noxious substances remaining in the exhaust gases as a result of incomplete combustion.

Since the temperature of the exhaust gases increases as the power output of the internal combustion engine increases, the excess heat delivered to the heating zone 4 by the exhaust gases is expediently removed by the cooling water which flows through a heating device, comprising the cooling water pipe 2 and the exhaust gas pipe 3, in countercurrent heat exchange contact with the hot exhaust gases. This prevents excessive heating of the fuel-air mixture which would diminish the performance of the internal combustion engine by decreasing the delivery rate of the fuel-air mixture.

Another advantage of the present invention is that the heating device is controlled by regulating the cooling water circulation and not the exhaust gas circulation. Accordingly, malfunctions due to the effect of the exhaust gases on the actuating mechanism of the shutoff device are prevented and sensitive and precise control is facilitated.

It will be understood that the above-described embodiment is merely exemplary and that persons skilled in the art may make many variations and modifications without departing from the spirit and scope of the invention. For example, the heating device may be employed both in internal combustion engines utilizing gasoline as fuel and in internal combustion engines utilizing methanol or a methanol-gasoline mixture as fuel. When methanol is used as fuel, methanol's greater heat of vaporization, compared with that of gasoline, makes it very difficult to form a satisfactory fuel-air mixture, especially during the cold-starting phase of the internal combustion engine, without heating the fuel-air mixture prior to combustion. All such modifications and variations are intended to be included within the scope of the invention as defined in the appended claims.

I claim:

1. In a mixture-drawing internal combustion engine including a cooling water circulation system, an intake conduit and an automatically controlled heating device in heat exchange contact with the intake conduit, the heating device receiving cooling water from the cooling water circulation system and exhaust gases from the internal combustion engine, the improvement wherein the cooling water and exhaust gases are maintained separately in the heating device in heat exchange contact with each other, the improvement further comprising a shutoff device for controlling the flow of the cooling water through the heating device, the shutoff device remaining closed until a predetermined cooling water temperature is reached, and when the predetermined cooling water temperature is reached the shutoff device opening increasingly as the temperature of the cooling water rises so that the amount of heat transferred from the exhaust gases to the cooling water is increased by circulation of the cooling water through the heating device, whereby excessive heating of the intake conduit by the exhaust gases is prevented.

2. The internal combustion engine of claim 1, wherein the shutoff device is a thermostat.

3. The internal combustion engine of claim 1, further comprising a cooling water pipe for delivering cooling water to the heating device from the cooling water circulation system and an exhaust gas pipe for delivering exhaust gases to the heating device from the internal combustion engine, the cooling water pipe and the exhaust gas pipe being arranged in mutual heat exchange contact with the bottom surface of the intake conduit.

4. The internal combustion engine of claim 3, wherein the cooling water in the cooling water pipe flows in countercurrent heat exchange contact with the exhaust gases in the exhaust gas pipe.

* * * * *